UNITED STATES PATENT OFFICE.

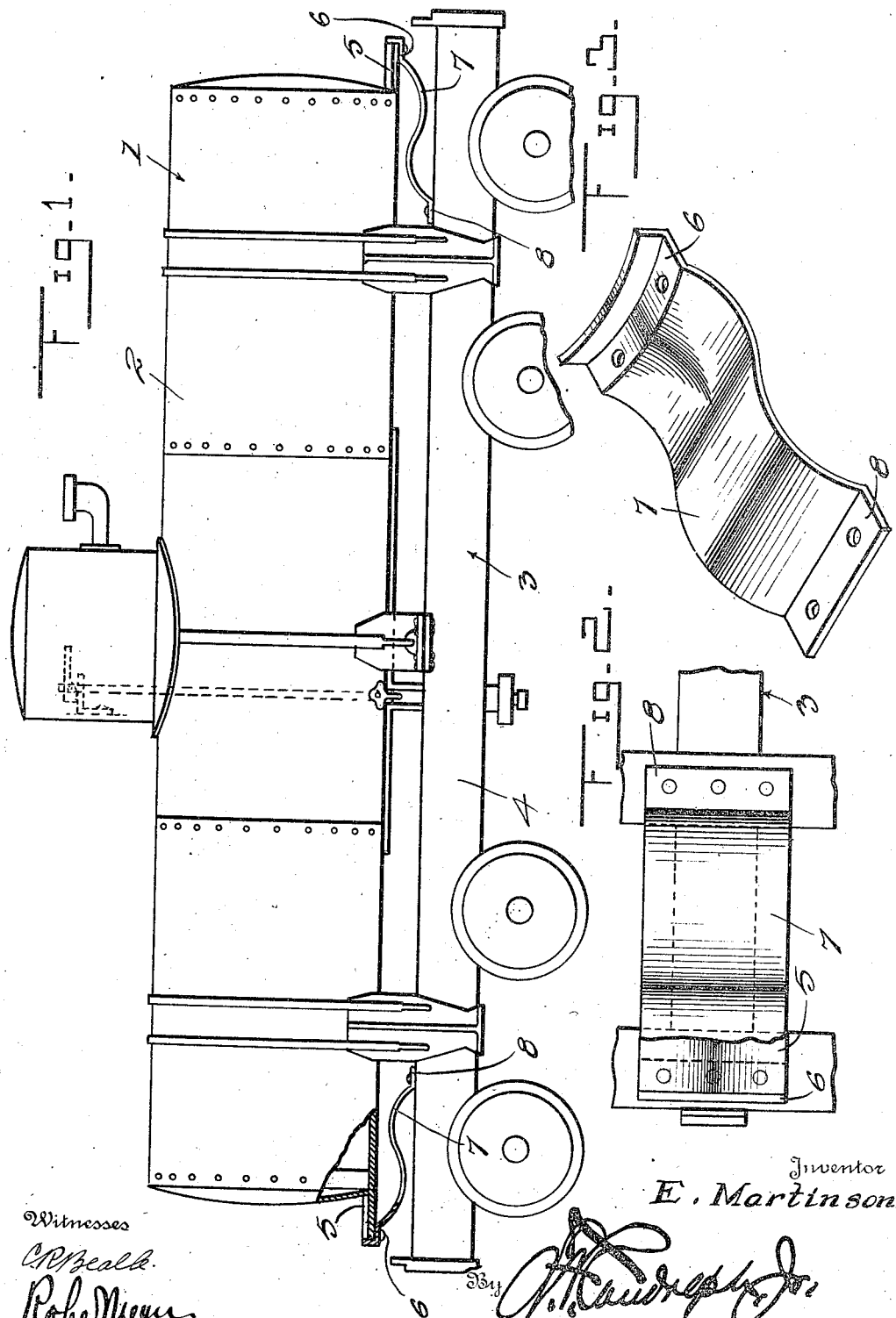

EDWARD MARTINSON, OF SUPERIOR, WISCONSIN.

OIL-TANK CAR.

1,156,794.    Specification of Letters Patent.    Patented Oct. 12, 1915.

Application filed February 8, 1915. Serial No. 6,912.

*To all whom it may concern:*

Be it known that I, EDWARD MARTINSON, a citizen of the United States, residing at Superior, in the county of Douglas and State of Wisconsin, have invented certain new and useful Improvements in Oil-Tank Cars; and I do hereby declare the following to be a full, clear, and exact description of the invention, such as will enable others skilled in the art to which it appertains to make and use the same.

This invention relates to oil tank cars, and the primary object of the invention is to provide a mounting or support for the tank of the car, for connecting it and supporting it above the sills of the car.

Another object of this invention is to provide a novel form of bracket for supporting the tank of an oil tank car above the sills, in such manner as to permit of a compensating movement of the bracket upon the expansion and contraction of the tank, thereby materially decreasing the possibility of the rupturing of the tank by the buffeting of the same during transit, and also to eliminate the breaking of the car truck.

Another object of this invention is to provide a supporting bracket, which extends inwardly beneath the ends of the tank, and is attached to the sills, inwardly of the ends of the same, for relieving the ends of the car sills of weight of the tank.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a side elevation of a tank car, constructed in accordance with this invention, showing parts thereof in section, Fig. 2 is a plan view of one of the supporting brackets for the tank, showing a fragment of the tank attached thereto, and Fig. 3 is a detail perspective view of one of the supporting brackets of the tank car.

Referring more particularly to the drawings, 1 designates an ordinary oil tank car as an entirety, which is composed of the oil retaining tank 2 and the supporting structure 3, which latter structure includes sills 4, as is ordinary in the construction of the platform of tank cars.

The tank 2 of the tank car has longitudinally extending ribs or extensions 5 formed upon the lower section of the opposite ends thereof. The extensions 5 are arcuate in end view or cross section, being merely extensions formed upon the bottom or lowermost portions of the tank 2, and they have their outer ends resting upon the substantially horizontal sections 6 of brackets 7. The supporting brackets 7 are constructed of suitable sheet metal and have their upper terminals bent upwardly for engaging the ends of the extensions 5. The substantially horizontal section 6 of the brackets 7 are curved to conform to the curvature of the extensions 5, and the brackets are curved intermediate their substantially horizontal sections 6 and 8, to form a double curve to permit of the stretching of the brackets upon the expansion of the tank. The lower horizontal portions 8 of the brackets 7 are secured to the upper surface of the sills 4 of the car truck in any suitable manner, for suspending the tank 2 above the car truck 3 for practically eliminating the possibility of rupture of the tank during the buffeting of the same.

By the double curving of the intermediate portions of the brackets 7, the brackets will be susceptible to compensating movement to the expansion or contraction of the tank 2 under various temperature conditions.

The brackets 7 extend rearwardly beneath the tank 2, and have their horizontal ends 8 secured to the sills 4 inwardly of the outer ends of the tank, for relieving the ends of the truck from the strain of supporting the tank.

From the foregoing description taken in connection with the accompanying drawings the advantages of construction and of the method of operation of the improved oil tank car will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a tank car, the combination with an ordinary car truck, of a fluid retaining tank having extensions formed upon the ends of said tank and integrally with the construction thereof, brackets having substantially horizontal portions formed thereupon for attachment to said car truck, and substantially arcuate horizontal portions formed upon the upper ends of said brackets for engagement with said projections for supporting said tank upon said truck, said brackets extending inwardly of the ends of said tank and secured to said truck for supporting the strain of the tank inwardly of the ends of the truck.

2. In a tank car, the combination with an ordinary car truck, of a fluid retaining tank having extensions formed upon the ends of said tank and integrally with the construction thereof, supporting brackets for said tank having their upper ends curved for lying in snug engagement with the under surfaces of said extension, said brackets having their lower ends horizontal for engagement with an ordinary car truck, the intermediate portions of said brackets being curved upwardly and downwardly to provide for a compensating movement of the brackets upon expansion or contraction of said tank.

3. In an oil tank structure, the combination of an ordinary fluid retaining tank, a truck for supporting said tank, of brackets for supporting said tank above said truck, said brackets being constructed of sheet metal and curved sinuously intermediate of their ends to permit of compensating movement of said brackets upon expansion or contraction of said fluid tank.

In testimony whereof I affix my signature in presence of two witnesses.

EDWARD MARTINSON.

Witnesses:
WILLIAM HENRY BURKE,
SAM CARLSON.

Copies of this patent may be obtained for five cents each, by addressing the "Commissioner of Patents, Washington, D. C."